US006845276B2

(12) United States Patent
Bocchi

(10) Patent No.: US 6,845,276 B2
(45) Date of Patent: Jan. 18, 2005

(54) MULTIPLE AXIS MODULAR CONTROLLER AND METHOD OF OPERATING SAME

(75) Inventor: Curt Bocchi, Minnetonka, MN (US)

(73) Assignee: Electro Scientific Industries, Portland, OR (US)

( * ) Notice: Subject to any disclaimer, the term of this patent is extended or adjusted under 35 U.S.C. 154(b) by 295 days.

(21) Appl. No.: 10/184,457

(22) Filed: Jun. 28, 2002

(65) Prior Publication Data

US 2003/0009242 A1 Jan. 9, 2003

Related U.S. Application Data

(60) Provisional application No. 60/302,091, filed on Jun. 29, 2001.

(51) Int. Cl.$^7$ .............................. G05B 19/04; B25J 13/00
(52) U.S. Cl. .................... 700/61; 318/567; 318/568.11; 318/568.2; 901/8
(58) Field of Search ............................... 700/11, 19, 20, 700/61, 112, 114, 121, 245, 255; 318/567, 568.11, 568, 2; 901/8, 16, 23

(56) References Cited

U.S. PATENT DOCUMENTS

| | | | | |
|---|---|---|---|---|
| 4,684,862 A | * | 8/1987 | Rohrle | ................... 318/568.2 |
| 4,878,002 A | * | 10/1989 | Heatzig et al. | ........... 318/568.2 |
| 5,513,096 A | * | 4/1996 | Casler et al. | .................. 700/20 |
| 6,188,190 B1 | | 2/2001 | Arakawa | |
| 6,208,104 B1 | * | 3/2001 | Onoue et al. | ........... 318/568.11 |
| 6,272,397 B1 | | 8/2001 | Yamada et al. | |
| 6,472,938 B2 | * | 10/2002 | Imai | ........................... 330/140 |
| 6,597,971 B2 | * | 7/2003 | Kanno | ........................ 700/245 |
| 2002/0107612 A1 | * | 8/2002 | Hiruma | ..................... 700/250 |

FOREIGN PATENT DOCUMENTS

| | | | |
|---|---|---|---|
| GB | 002102590 | * | 2/1983 |
| JP | 404018609 | * | 1/1992 |
| JP | 2000108062 | * | 4/2000 |

* cited by examiner

*Primary Examiner*—Emanuel Todd Voeltz
(74) *Attorney, Agent, or Firm*—Young & Basile, P.C.

(57) ABSTRACT

A multiple axis modular controller and a method of operating the controller in a system comprising input devices receiving indications of system conditions and output devices performing tasks affecting the system conditions. The controller includes input connectors connectable to the input devices and output connectors connectable to the output devices. A processor executes a series of sequential commands of an application program. A command can be executed in response to completion of one sequential command of the series of sequential commands regardless of a next sequential command in the series of sequential commands or in response to a specified input received at one of the input connectors or in response to a specified output sent to one of the output connectors. The processor does not execute the command, minimizing processor delays.

20 Claims, 18 Drawing Sheets

CPLD Interface Functions

US 6,845,276 B2

MULTIPLE AXIS MODULAR CONTROLLER AND METHOD OF OPERATING SAME

CROSS-REFERENCE TO RELATED APPLICATION

This application claims the benefit of provisional application Ser. No. 60/302,091, filed Jun. 29, 2001, and entitled "Multiple Axis Module Controller."

BACKGROUND OF THE INVENTION

1. Field of the Invention

The invention relates in general to a controller used to control multiple motors, each associated with an axis of movement, wherein the controller is a modular controller, and a method of operating such a multiple axis modular controller.

2. Description of the Related Art

In conventional controllers for a system including multiple subsystems, such as a wafer inspection system, each subsystem is provided with a control unit. For a large system controlling motors along multiple axes of movement, not only must the control units for each subsystem communicate with the motors to which they are connected, they must be able to communicate with each other. For example, in a wafer inspection system, a robot that is transferring a wafer to an inspection stage must know when the stage has secured the wafer so that the robot can stop its motion and release its hold on the wafer.

Conventionally, the position, movement, power level, and other parameters for control of each subsystem of a system are coordinated by a central control unit. The individual pieces of information required by each actuator, such as a servo motor of a robot, are conveyed through the control unit to the central controller, which sends actuating signals to the individual actuators through the appropriate control unit of a subsystem. This can result in a substantial processor burden on the central controller, resulting in slow operation of the system controlled. Further, the more complex the system controlled, the more complex the electrical connections due to the extensive wiring and cabling to the central controller.

Efforts to speed up these operations using faster processor in control units have been made, but they fail to address the resulting complex electrical connections. Also, the complexity of desired operation of systems controlled by these controls units progresses at pace with the increased speeds, with the result that processing delays are still experienced. The combination of speed and processing delays can cause errors in the operation of the system. Increased complexity also increases the risk that the failure of an individual control unit will cause failure of the operation of the entire system, potentially damaging any product in the system.

SUMMARY OF THE INVENTION

This desire for the reduction of processing delays in operating a system is addressed by the present invention, in which the first aspect is a multiple axis modular controller for use in a system comprising input devices receiving indications of system conditions and output devices performing tasks affecting the system conditions. The output devices include at least a first motor and a second motor where the first motor and the second motor are operable to cause movement of a first axis and a second axis. When movement of an axis is discussed, it means movement of a tool, workpiece or product along an axis. The controller includes a plurality of input connectors, each of the plurality of input connectors connectable to a respective one of the input devices, and a plurality of output connectors, each of the plurality of output connectors connectable to a respective one of the output devices. The controller also includes a processor operable to execute a series of sequential commands of an application program and means, separate from the processor, for executing a command in response to completion of one sequential command of the series of sequential commands regardless of a next sequential command in the series of sequential commands, or in response to a specified input received at one of the plurality of input connectors, or in response to a specified output sent to one of the plurality of output connectors. Thus, one or more commands can be executed without incurring processor time.

A second aspect of the invention is a method of operating a multiple axis modular controller in a system comprising input devices receiving indications of system conditions and output devices performing tasks affecting the system conditions. Again, the output devices include at least a first motor and a second motor, the first motor and the second motor operable to cause movement of a first axis and a second axis, respectively. The method comprises connecting each of a plurality of input connectors to a respective one of the input devices and connecting each of a plurality of output connectors to a respective one of the output devices. The method also includes executing a series of sequential commands of an application program using a processor and executing, using means separate from the processor, a command in response to completion of one sequential command of the series of sequential commands regardless of a next sequential command in the series of sequential commands, or in response to a specified input received at one of the plurality of input connectors, or in response to a specified output sent to one of the plurality of output connectors.

Additional features of the present invention are contemplated and are described herein.

BRIEF DESCRIPTION OF THE DRAWING

The various features, advantages and other uses of the present invention will become more apparent by referring to the following detailed description and drawing in which.

DETAILED DESCRIPTION

Figure 1:
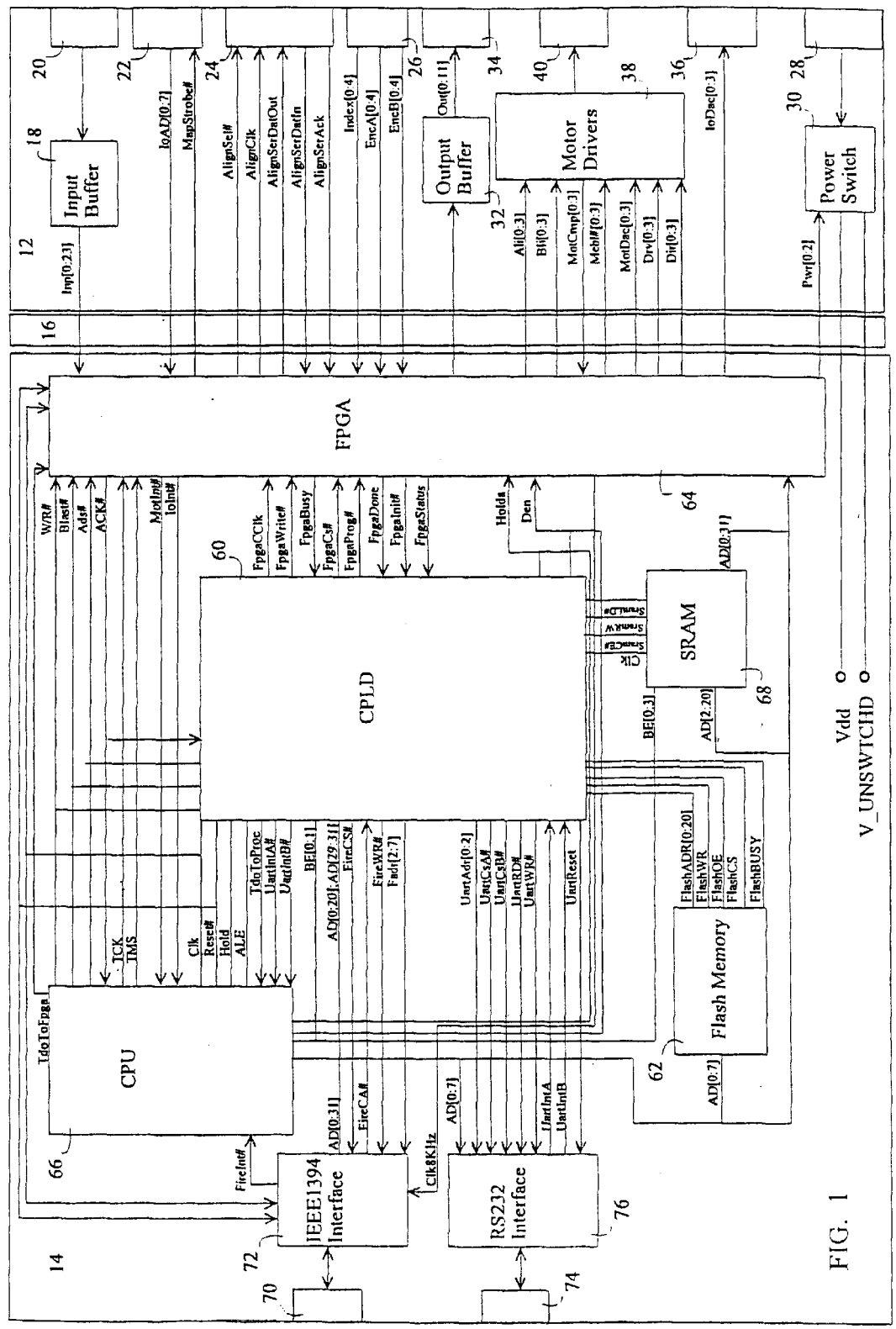
FIG. 1 is a block diagram showing the multiple axis controller according to one embodiment of the present invention.

Referring now to the drawing, one embodiment of the multiple axis modular controller of the present invention is shown in FIG. 1 and described with reference to FIGS. 1–18. As shown in FIG. 1, the controller 10 includes a distribution card 12 and a processor card 14 connected through a connector interface 16. Although FIG. 1 shows the controller 10 as including two cards 12, 14, one card can include all of the functionality to be discussed hereinafter. Also, the components of each card 12, 14 can be further separated onto additional cards, resulting in a controller 10 of three or more cards. The connector interface 16 is an interface incorporated for communications between cards 12 and 14. Preferably, the connector interface 16 is a 4×30 interface to accommodate the inputs and outputs of the embodiment shown in FIG. 1.

Because of its modular design, the controller 10 is well-suited to control one subsystem of a larger system, such as a robot or gantry in a wafer inspection system. To provide power to the controller and an interface with other controllers of a system, the controller 10 preferably includes one power connector port 28, three IEEE 1394-1995 compatible (IEEE 1394) ports 70 (only one shown) and two RS232 serial ports 74 (only one shown), each to be discussed hereinafter. Together, these ports 28, 70, 74 interface the controller 10 with a system in which it is incorporated.

In addition to the controller 10 possibly interfacing with other controllers in a larger system, the controller 10 must interface with the devices and components that make up the subsystem the controller 10 controls. Generally, the distribution card 12 contains the hardware, such as input and output connectors, that physically perform this integration, while the processor card 14 includes the hardware and firmware that control the subsystem and its relationship with other controllers. An application program issues software commands described herein to the controller 10 and is preferably run by a separate host personal computer (PC). However, the CPU 66 of the processor card 14 optionally runs the application program. It must be noted that although the controller 10 is ideal in controlling a subsystem that is part of a larger system, the controller 10 can also be used in a system containing only one subsystem, that is, a system where the controller 10 has enough connectors to accommodate all of the input and output devices that make up the system without requiring the interconnection of another controller.

Figure 2:
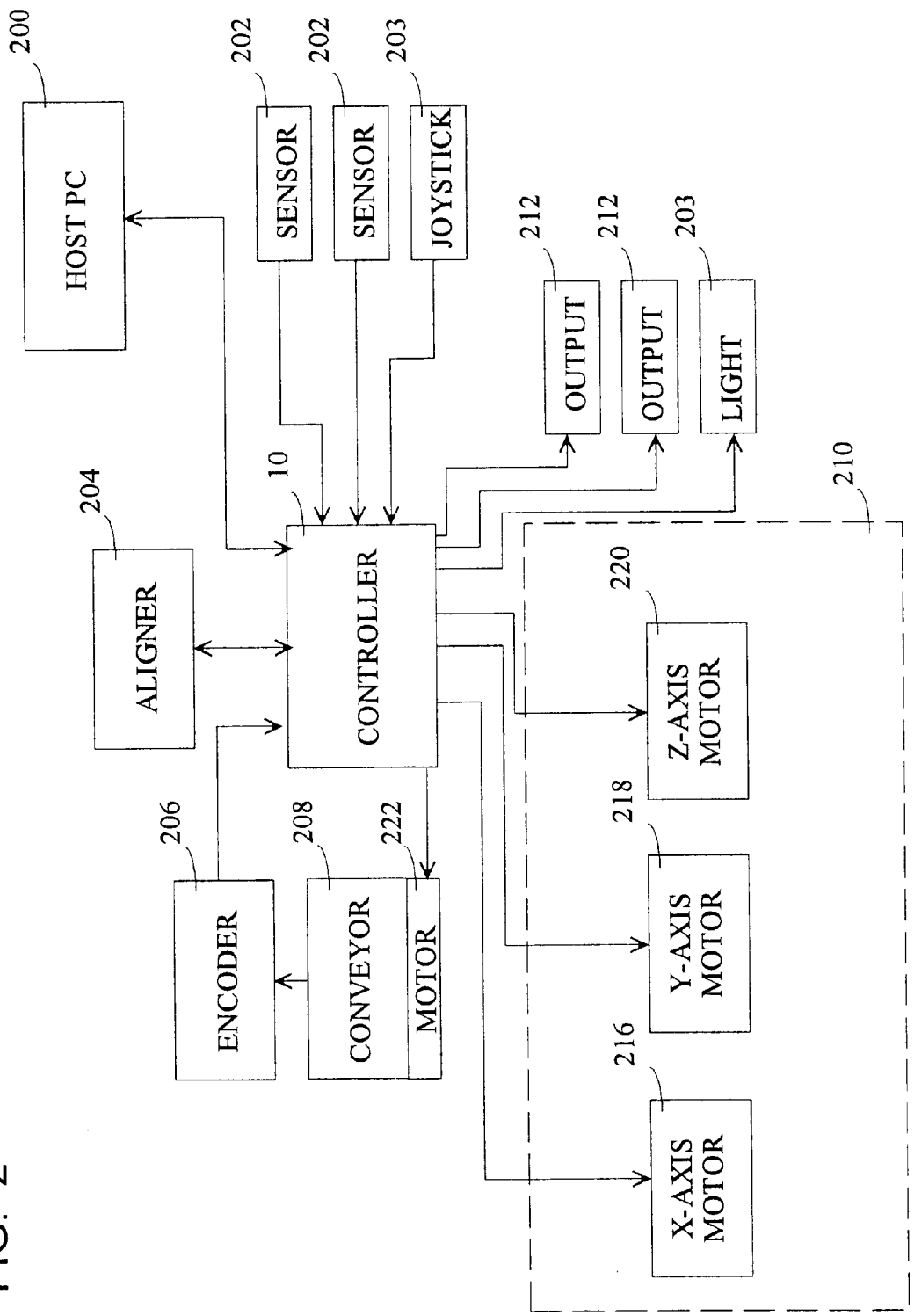
FIG. 2 is a functional block diagram of the controller according to FIG. 1 incorporated into a portion of a wafer inspection system.

A functional block diagram of the controller 10 incorporated into a portion of a wafer inspection system is shown in FIG. 2. The host PC 200 is shown connected to the controller 10. The host PC 200 is typically connected to the controller 10 through one of the IEEE 1394 ports 72 on the processor card 14 and the host PC's own IEEE 1394-compatible port and interface. The host PC 200 is a standard PC with a central processing unit (host processor), read only memory, random access memory, and input/output control circuitry. The host processor is capable of running the application program by providing any number of available commands, many of which are described hereinafter, to the controller 10. Only one host PC 200 is used, regardless of the number of interconnected controllers.

The controller 10 receives inputs from various sources, such as sensors 202, an optional joystick 203, an aligner 204 and at least one encoder 206. For example, one sensor 202 could be a proximity switch indicating that a wafer cassette is at a particular point along a conveyor 208. In any system for handling or inspecting wafers, one device that is part of such a system is typically an aligner 204, which finds the rotational center and angular orientation of a semiconductor wafer. An encoder 206 outputs a signal indicating the position of a component of a system, usually along a linear or rotary axis. Here, only one encoder 206 indicates the position of the conveyor 208, however, an encoder is associated with the motor for each axis X, Y and Z of an arm of a robot 210.

The controller 10, as stated, receives these inputs and, in turn, controls outputs 212 based upon its programming. One output controlled by the controller 10 includes, for example, a status light 214 indicating a fault when the input from the proximity switch sensor 202 does not activate within a certain time window. Another output 212 controlled by the controller 10 can be a toggle switch activating, for example, an inspection laser (not shown) when a wafer is in place for inspection. The controller 10 also controls movement along an axis. As shown, the controller 10 controls three axes of an arm of the robot 210 using an X-axis motor 216, an Y-axis motor 218 and an Z-axis motor 220. The controller 10 also controls an axis of a conveyor 208 on which wafer tray (not shown) is mounted using a conveyor motor 222. Thus, for example, when the conveyor motor 222 moves the wafer tray into the appropriate position, the controller 10 instructs the motors 216, 218 and 220 of the robot 210 to remove a wafer from the wafer tray. Note that controller 10 is described in reference to subsystems of a wafer handling and inspection system for illustrative purposes only; its modular design is well-suited to many applications.

Controller Initialization

Figure 3:
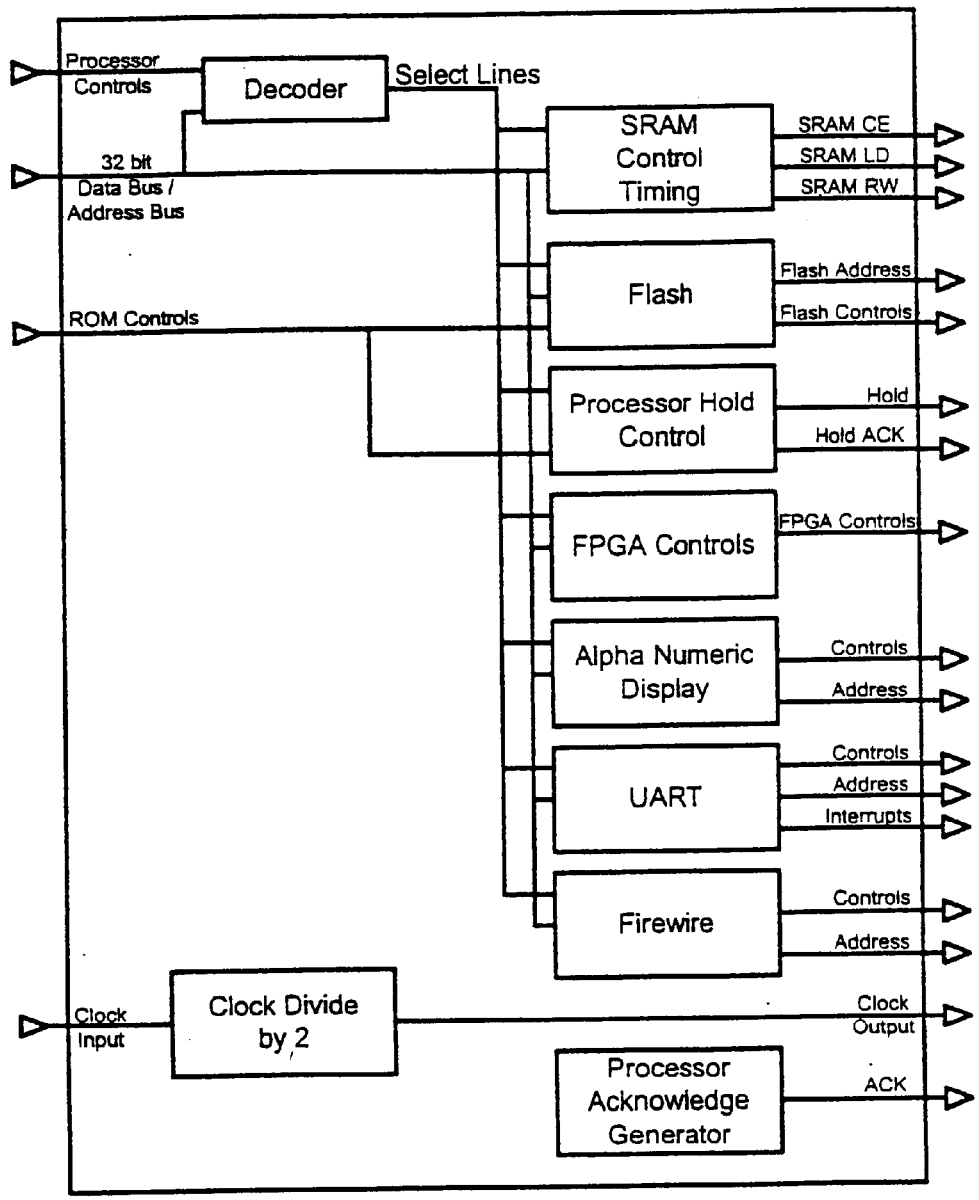
FIG. 3 is a block diagram of the interface functions of the complex programmable logic device according to FIG. 1.

The ability of the controller 10 to utilize the commands from the application program run either on-board the controller 10 or by a host PC, such as host PC 200, requires an initial set up of the controller 10. This initialization of the controller 10 starts with the programming of a complex programmable logic device (CPLD) 60 incorporated on the processor card 14. As shown in FIG. 1, the CPLD 60 is a blank controller programmed with the interface functions as shown in FIG. 3 through an IEEE Standard 1149.1 (JTAG) port (not shown). Upon power-on or reset, the interface functions of the CPLD 60 cause it to decode and coordinate access to the functionality of the other components of the processor card 14. As shown in FIG. 3, the CPLD 60 provides interface functions for flash memory 62, a field-programmable gate array (FPGA) 64, a central processing unit (CPU) 66, static random access memory (static RAM or SRAM) 68, the IEEE 1394 (FIREWIRE®) Interface 72, and the RS232 (UART) Interface 76. The alphanumeric display interface shown in FIG. 3 is not used in the described embodiment as the use of an alphanumeric display (not shown in FIG. 1) is optional.

For the controller 10 to function correctly after power-on or reset, additional steps must be completed after programming the CPLD 60. Valid programs must be downloaded from the application program into the flash memory 62. Code for the field-programmable gate array (FPGA) 64 and the embedded code for the central processing unit (CPU) 66 is downloaded into the flash memory 62 through a flash programming port (not shown), which is a parallel interface to the CPLD 60. Preferably, the flash memory 62 is 8 Megabit non-volatile memory that may be erased electrically at the block or chip level and programmed on a byte-by-byte basis.

Upon power-on, the CPLD 60, flash memory 62, FPGA 64 and CPU 66, together with the static RAM 68, bring the controller 10 to an operating state. First, the CPU 66 initializes using control tables in the flash memory 62, as is standard, and performs a random access memory (RAM) integrity test. The code for the FPGA 64 is loaded from the flash memory 62, programming the FPGA 64 with certain logic functions, shown in FIGS. 4–9 and to be discussed hereinafter. After the code for the FPGA 64 is loaded, the controller 10 will begin operating in accordance with the embedded code of the CPU 66, shown in FIGS. 10–17. The CPU 66 is preferably a 32-bit CPU with a 16K instruction cache and a 4K data cache that can then execute software commands of the application program. The embedded code and the software commands will be discussed hereinafter in more detail.

After the CPLD 60 and the FPGA 64 are configured, and all of the embedded code is input into the CPU 66, the controller 10 functions correctly after power-on or reset in response to the software commands of the application software. Subsequent downloading of new code for the FPGA 64 or embedded code for the CPU 66 can be done using configuration software commands transmitted from the host processor. Specifically, a special high level host interface command can be used to download an application program, boot program or FPGA configuration file to the controller 10. The host processor can also program all controllers in a system simultaneously by broadcasting the command over the entire network of controllers. Preferably, one configuration command gets or sets the name of the controller 10 on the network it is connected to through its IEEE 1394 connector 70 in order to more easily identify to which controller a command is addressed.

Certain of the commands available for use in an application program are described herein. However, many standard commands are omitted. For example, those related to reading and writing values from or to the static RAM 68 and/or the flash memory 62 are not included. Further, commands such as those that merely report the states of digital inputs and outputs, the encoder counts for each axis, etc., and commands that configure data such as axis setup parameters and digital input setup parameters are omitted as these are within the level of skill in the art, provided with the teachings herein. As it should also be understood, the specific commands used and their order in an application program depend upon the devices and components attached to the controller 10 and the desired operation of the subsystem. Provided with the teachings herein, one of skill in the art can prepare an application program to perform desired functions using standard commands and the software commands described herein.

Distribution Card

The distribution card 12, as mentioned, generally integrates the controller 10 into a subsystem. The distribution card 12 performs this function using connectors allowing input signals from input devices that monitor the subsystem and connectors providing output signals to output devices that make up the subsystem. Because of its modular design allowing incorporation into a variety of subsystems, operation of a controller 10 in a particular subsystem may not require all of the input and output connectors provided herein. In any case, the numbers of input and output connectors shown and described are by example only.

The distribution card 12 contains digital input buffers 18 receiving input signals from digital input connectors 20. Digital input signals to the controller 10 may include, by example, output signals from such digital input devices as limit switches or proximity detectors. Although only one digital input connector 20 and its associated input buffer 18 is shown in FIG. 1, more than one is preferred. In the embodiment shown in FIG. 1, twenty-four digital input connectors 20 with buffers 18 provide the digital input signal INP[0:23] to the processor card 14. The digital input connectors 20 are optionally 5-pin connectors.

A software command of the application program samples a selected digital input at a digital input connector 20. Digital inputs from each digital input connector 20 are buffered through an associated digital input buffer 18, which isolates the digital input device from the electronics of the controller 10 and vice versa. Any standard digital buffer can be incorporated, such as one including a photocoupler. To enable the controller 10 to interface with input devices operating at various voltage levels, the input buffer 18 can include jumpers allowing the optional supply of different operating voltages to the digital input connectors 20. The different operating voltages will be discussed hereinafter with respect to the digital output buffer 32 of the distribution card 12.

The distribution card 12 contains analog input connectors 22 allowing the controller 10 to monitor parameters of the subsystem from such analog input devices as a thermocouple, a rheostat or a joystick. As with the digital input connectors 20, only one analog input connector 22 is shown in FIG. 1, but a preferred embodiment includes more than one. By example, the analog input connectors 22 are four 5-pin connectors supplying eight single-ended or four differential analog input signals. In FIG. 1, the four analog input connectors 22 provide analog input signal IoAD[0:7] to the processor card 14. Of course, prior to providing the analog input signals to any component of the processor card 14, they are converted from analog to digital. Although not shown, analog-to-digital (A/D) converters are preferably mounted on the processor card 14 for this purpose. Another software command causes an A/D conversion of a signal from a specified analog input connector 22, sampling an analog input from a monitored device.

In a preferred embodiment, an output signal MapStrobe# from the processor card 14 replaces the ground of one pin of an analog input connector 22 of the distribution card 12 to provide a unique delayed sampling function. This function allows an analog input to be received for a period of time before the A/D conversion is initiated to coordinate the A/D sampling and conversion with the occurrence of the peak of the input signal. For example, the input connector 22 can be set up so that when the MapStrobe# signal goes active, it causes a sensor connected to the input of that analog input connector 22 to produce an input signal. After a programmable period of time set by a software command, the MapStrobe# signal goes inactive, causing the FPGA 64 of the processor card 14 to initiate an A/D conversion to sample the peak of the input signal. This feature is particularly useful when used with a sensor used to detect the presence of, for example, a wafer in a transport cassette. If the peak of the input signal received from the sensor in the predetermined time period in which MapStrobe# is active does not match an expected value, it is likely that the wafer is not present.

Other commands can be included for particular input or output devices attached to the controller 10. One example of this is an optional joystick attached to the controller 10 at an analog input connector 22. Special commands for the joystick can include a command to set or get the joystick parameters for the individual joystick axes, where the parameters include, for example, the joystick identification number, the analog input connector 22 to which the joystick is attached, each value when the joystick is in its maximum negative, center or rest, and maximum positive positions, and the time period between joystick data samples, among others. One particularly useful feature is a command to turn on or off a scan mode for the joystick. When the scan mode is on and the joystick is enabled, the joystick position information is periodically broadcast to all controllers on the network. This allows the position of the joystick attached to one controller 10 to be used to control the position or velocity of an axis attached to a different controller.

A serial interface connector 24 mounted on the distribution card 12 allows inputs to and receives outputs from a peripheral device. For example, when the controller 10 is incorporated into a subsystem used in handling or inspecting wafers, one device that would be a part of the system is the aligner previously mentioned with respect to FIG. 2, which finds the rotational center and angular orientation of a semiconductor wafer. By example only, the embodiment in FIG. 1 shows the inputs and outputs where the serial interface 24 is connected to such an aligner. It is worth noting that whatever peripheral device is connected to the serial interface 24 on the distribution card 12, commands for such device are typically incorporated into the application program. In the case where the serial interface 24 is connected to an aligner, as shown in FIGS. 1 and 2, a typical command sent to the aligner acquires a single sample of aligner data as an input, where the data represents the position of the first pixel on the aligner array that is shadowed or covered.

In subsystems and systems in which the controller 10 is incorporated, one or more encoders are generally included. As mentioned, an encoder outputs a signal indicating the position of a component of a system, usually along a linear or rotary axis. In addition to the example previously provided with respect to FIG. 2, an encoder can be used to indicate, for example, the position of a camera inspecting a product. The controller 10 incorporates encoder input connectors 26, which supply encoder inputs to the processor card 14. Like the digital and analog input connectors 20, 22, only one encoder input connector 26 is shown in FIG. 1, but more than one is usually included. In fact, an encoder is typically associated with each axis controlled by the multiple axis modular controller 10. For example, five 8-pin encoder connectors 24 whose inputs are fed through differential line receivers (not shown) can provide the inputs EncA[0:4], EncB[0:4] and Index [0:4]. Of course, certain software commands are associated with encoders. For example, commands exist to set or read the encoder position register for a specified axis or the current position for a specified motor encoder, capture the encoder count when an encoder index signal occurs, and compare one or more positions against the actual axis position. The use of the inputs from encoders and incorporation of the inputs into the functions of the controller 10 will be discussed in more detail herein.

As shown in general in FIG. 1, the power connector port 28 on the distribution card 12 provides V_UNSWTCHD to the processor card 14 and an operating voltage Vdd, typically about 5 volts DC, to both the distribution card 12 and the processor card 14 through a power cable (not shown). The 8-pin power connector port 28 also provides switchable voltages Vsa, Vsb and Vsc to a power switch 30. In one embodiment, Vsa is 12 volts, Vsb is 24 volts and Vsc is 42 volts. The power switch 30 is designed to receive a signal from the processor card 14 to determine which, if any, of the switchable DC voltage sources is enabled for use by either the controller 10 itself, a device or component to which an input or output of the controller 10 is connected, or both.

A software command turns the power switch 30 on to allow the different operating voltages onto the distribution card 12 and processor card 14 of the controller 10. In the embodiment shown in FIG. 1, the signal Pwr[0:2] from the processor card 14 to the power switch 30 indicates which, if any, of Vsa, Vsb or Vsc is enabled at any particular point in the operation of the controller 10. By example, a signal Pwr[00] indicates no switchable voltage is enabled, a signal Pwr[01] indicates Vsa is enabled, a signal [10] indicates Vsb is enabled, and a signal Pwr[11] indicates Vsc is enabled. Although only three switchable voltage sources are provided as an example, additional DC voltages are possible. The ability to switch voltages that control subsystem actuators or motors permits power to be applied to these devices in a controlled sequence so that unexpected physical events that could cause damage can be avoided. This is especially important following the initial power-up of the system where the functioning of the control logic must be established before power is applied to the subsystem actuators. It should be noted that although the power switch 30 is not shown in detail, its design is within the level of skill of one in the art given the teachings herein.

In addition to these sources of input signals to the controller 10, the distribution card 12 also provides means for output signals from the controller 10 to reach components of the subsystem. One has previously been mentioned. Specifically, the serial interface 24, in addition to providing inputs to the processor card 14, also supplies signals from the processor card 14 to the aligner previously discussed. One such signal includes a software command setting the scan rate for the aligner sensor.

The distribution card 12 contains digital output buffers 32 receiving signals from the processor card 14 and sending buffered digital output signals through digital output connectors 34 in response to a software command to write a digital output value to a specified digital output connector 34. Such digital output signals can operate solenoids, actuators, gates, lights, indicators, etc. The digital output connectors 34 are optionally 3-pin connectors. Each output signal is buffered through a conventional digital output buffer 32, which isolates the outputs from the electronics of the controller 10 and vice versa. Each output buffer 32 preferably incorporates the capability of using any one of the available switchable voltages to provide a supply voltage for the output connectors 34 through the incorporation of jumpers (not shown) to the switchable voltages, Vsa, Vsb or Vsc in the example previously provided. This feature, and a similar feature on each input buffer 18, allows easy incorporation of the module controller 10 into a variety of subsystems with devices and components operating at different voltage levels. In FIG. 1, only one digital output connector 34 with its associated digital output buffer 32 is shown; however, more than one connector 34 is preferable. By example, twelve digital output connectors 34 with buffers 32 provide the output signal Out[0:11] to the subsystem.

Figure 4:
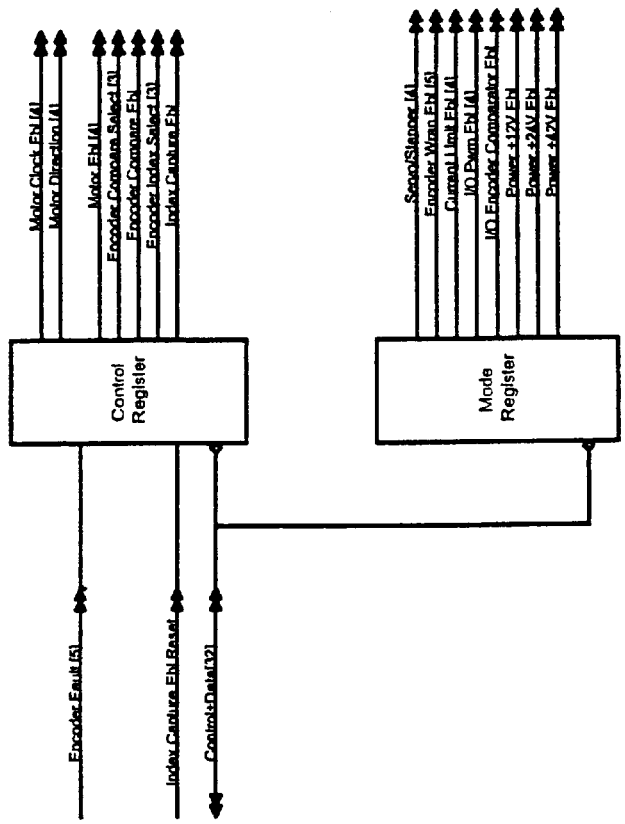
FIG. 4 is a block diagram of the control and mode registers of the field-programmable gate array according to FIG. 1.

Any of the twelve digital output signals may be configured via the FPGA control register, shown in FIG. 4, to operate in a pulse width modulated (PWM) mode by another software command. The command causes a specified digital output connector 34 to convert to PWM mode with a variable duty cycle. This feature allows a digital output signal to produce an average analog output level when integrated over a period of time. For example, one implementation allows the on-time of the digital output to be adjusted from 0% to 100% for every one millisecond time interval. When applied to the control of a light-emitting diode (LED), for example, this technique allows the average brightness of the LED to be adjusted from 0% to 100% of its full brightness. In the embodiment represented by FIG. 4, four digital output signals are configured to operate in PWM mode.

An analog output connector 36 provides an analog output signal from the processor card 14 and through the distribution card 12 to a subsystem component such as a heater. In one embodiment, the analog output connector 36 is a 3-pin connector. Like the digital output connector 34, only one analog output connector 36 is shown in FIG. 1, but more than one is preferred. By example, four analog output connectors 36 provide the output signal IoDac[0:3] to the subsystem. One of skill in the art recognizes that at some point prior to supplying the output signal to the analog output connector 36, the signal must be converted from digital to analog. Either the distribution card 12 or the processor card 14 can incorporate the necessary digital-to-analog (D/A) converters. Yet another software command causes the D/A conversion of a signal sent to a specified analog output connector 36.

The four motor driver circuits 38 included in the controller 10 and shown on the distribution card 12 in the embodiment shown in FIG. 1 will be discussed in further detail after the discussion of the processor card 14.

Processor Card

FIG. 1 shows a block diagram of the major components of the processor card 14, along with the connections between them and the distribution card 12. Although each component of the processor card 14 has been previously mentioned with respect to the initialization of the controller 10, more details are described below. It should be initially noted that, in general, the components of the distribution card 12 utilize the supply voltage Vdd. However, if other components of the processor card 14 require a different supply voltage, the processor card 14 can incorporate any standard power converter (not shown).

Access to the various components of the processor card 14, such as the SRAM 68, flash memory 62, the FPGA 64, the IEEE 1394 Interface 72, and the RS232 Interface 76, are preferably controlled by the CPLD 60. As mentioned, the CPLD 60 is programmed in the initial set up of the controller 10 with the interface functions of FIG. 3, which, upon power-on or reset, decode and coordinate access to the functionality of the other components of the processor card 14. Once initially programmed, the CPLD 60 stays in its programmed condition until it is reprogrammed, even if power is lost. This feature of the CPLD 60 is a distinct benefit where the controller 10 is incorporated into a system with other controllers and, for example, the CPU 66 fails. In this case, the interface provided by the CPLD 60 still functions, allowing communications between the failed controller 10, the host PC and the remainder of the controllers of the system through the external interfaces 72, 76 and the respective connectors 70, 74 of the controller 10.

Although the CPLD 60 is described as being a complex programmable logic device, the CPLD 60 could be a standard programmable logic device, or several interconnected programmable logic devices. What device is chosen depends, in part, upon the number of devices and components with which the controller 10 is designed to interface. One suitable CPLD 60 for the controller 10 is the XCE95288XL from Xilinx, Inc. of San Jose, Calif.

The FPGA 64 is programmed with certain logic functions, shown in FIGS. 4–9, and acts as a buffer for the signals passing through the connector interface 16 either from the distribution card 12 or to the distribution card 12. These logic functions speed up the operation of the controller 10, as the FPGA 64 logic functions are performed once the FPGA 64 receives inputs without the need for further intervention by the CPU 66. The logic functions implemented in the FPGA 64, while preferably programmed into one integrated chip (IC) such as the XC2S150-FG256 from Xilinx, Inc., can be implemented in more than one gate array or in individual logic chips. Because the programmed logic functions of the FPGA 64 can be implemented with logic chips, the FPGA 64 logic functions are sometimes referred to as hardware functions herein.

Figure 5:
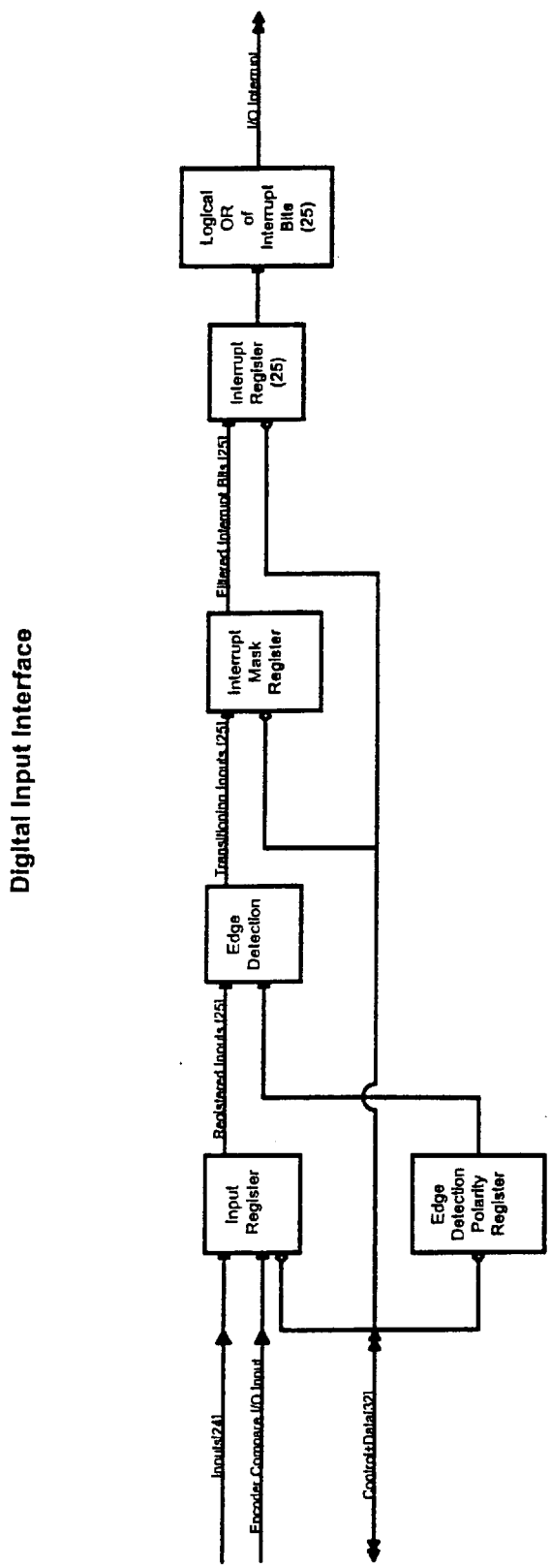
FIG. 5 is a block diagram of the digital input interface of the field-programmable gate array according to FIG. 1.
Figure 6:
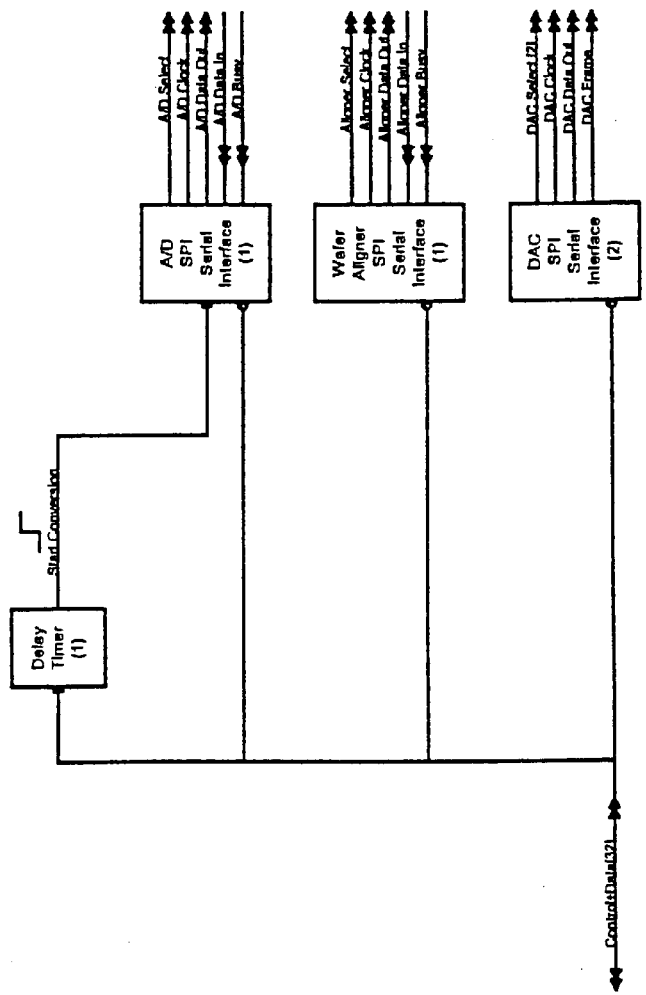
FIG. 6 is a block diagram of the peripheral serial interface of the field-programmable gate array according to FIG. 1.
Figure 7:
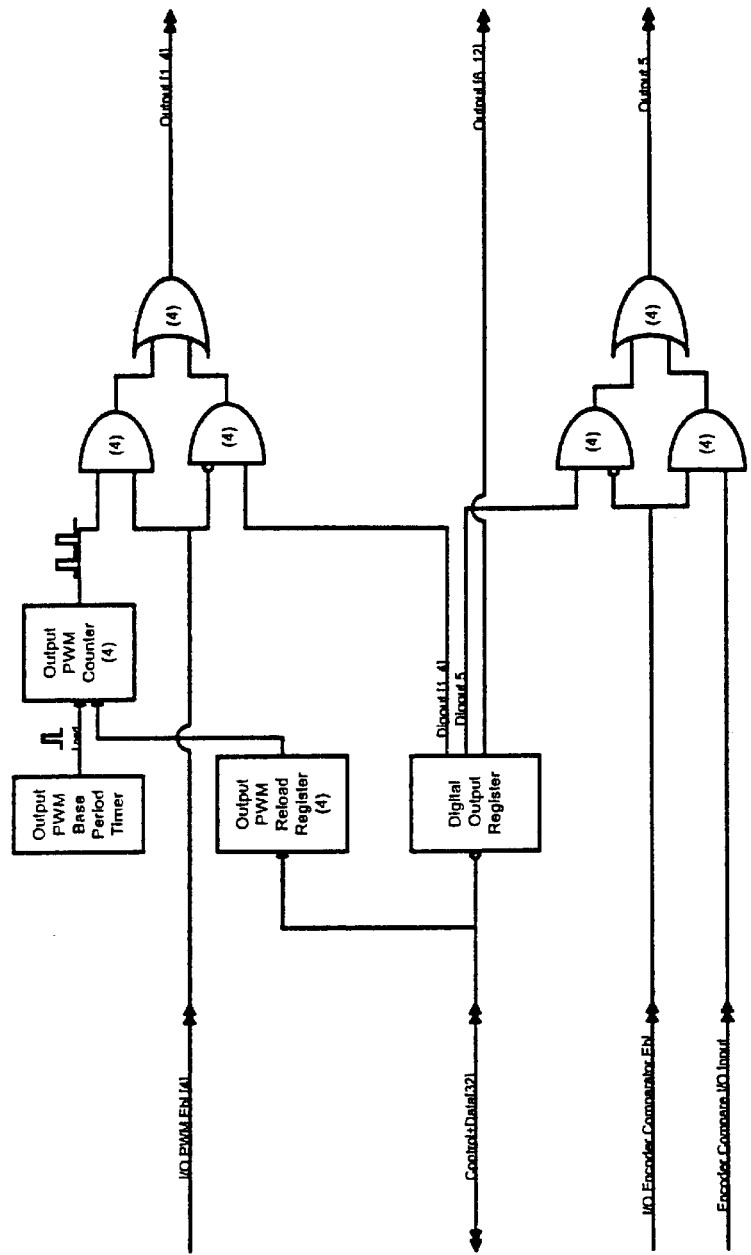
FIG. 7 is a block diagram of the digital output interface of the field-programmable gate array according to FIG. 1.

The logic function shown in FIG. 4 has been mentioned previously. It shows the inputs and outputs of the control and mode registers of the FPGA 64. The digital input interface of the FPGA 64 is shown in FIG. 5, which, among other things, performs data integrity checks of the digital input data received from the input buffers 18 of the distribution card 12. FIG. 6 shows the interface for a serial peripheral device. Specifically, and in accordance with our example, FIG. 6 shows the interface for an aligner, along with the inputs to and outputs from the interface. FIG. 7 shows the digital output interface of the FPGA 64. The digital output interface receives the output signals from the remainder of the controller 10 and supplies them to the output buffers 32, which in turn supplies the buffered signals to the digital output connectors 34. FIG. 7 also shows the logic by which a digital output connector 34 receives signals that cause it to operate in PWM mode.

Figure 8:
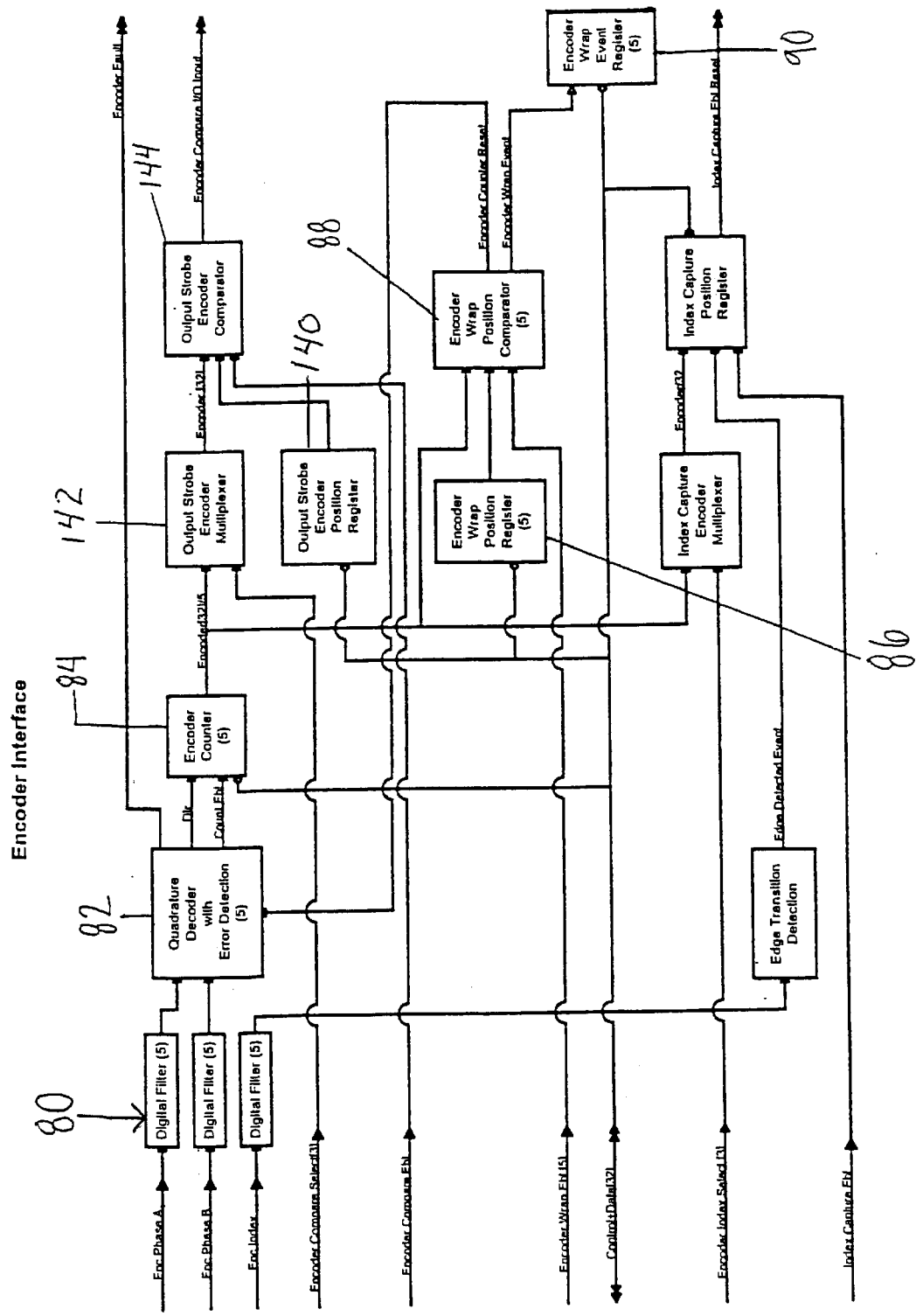
FIG. 8 is a block diagram of the encoder interface of the field-programmable gate array according to FIG. 1.

The encoder interface of the FPGA 64 shown in FIG. 8 illustrates several unique features of the present invention. When the controller 10 is operational, each encoder of the subsystem produces a quadrature (phase) output to the encoder input connectors 26. By example to FIG. 1, one encoder produces EncA2 and EncB2, while another produces EncA0 and EncB0. A proper phase transition of the inputs occurs when only one state of one input changes at a time. Again by example, if the first phase output is (0/1), that is, EncA2 is 0 and EncB2 is 1, then the next phase output, if correct, is either (1/1) or (0/0). Occasionally, something goes wrong with a particular encoder due to broken wires or misalignment. When this happens, it is likely that an incorrect phase transition of the inputs occurs. According to the example above, if the phase output started at (0/1), a next phase output of (1/0) is incorrect. Such invalid encoder inputs can cause the motion control loop of a motor to incorrectly drive the motor, potentially causing damage to the system or the product being handled, such as a semiconductor wafer.

Figure 9:
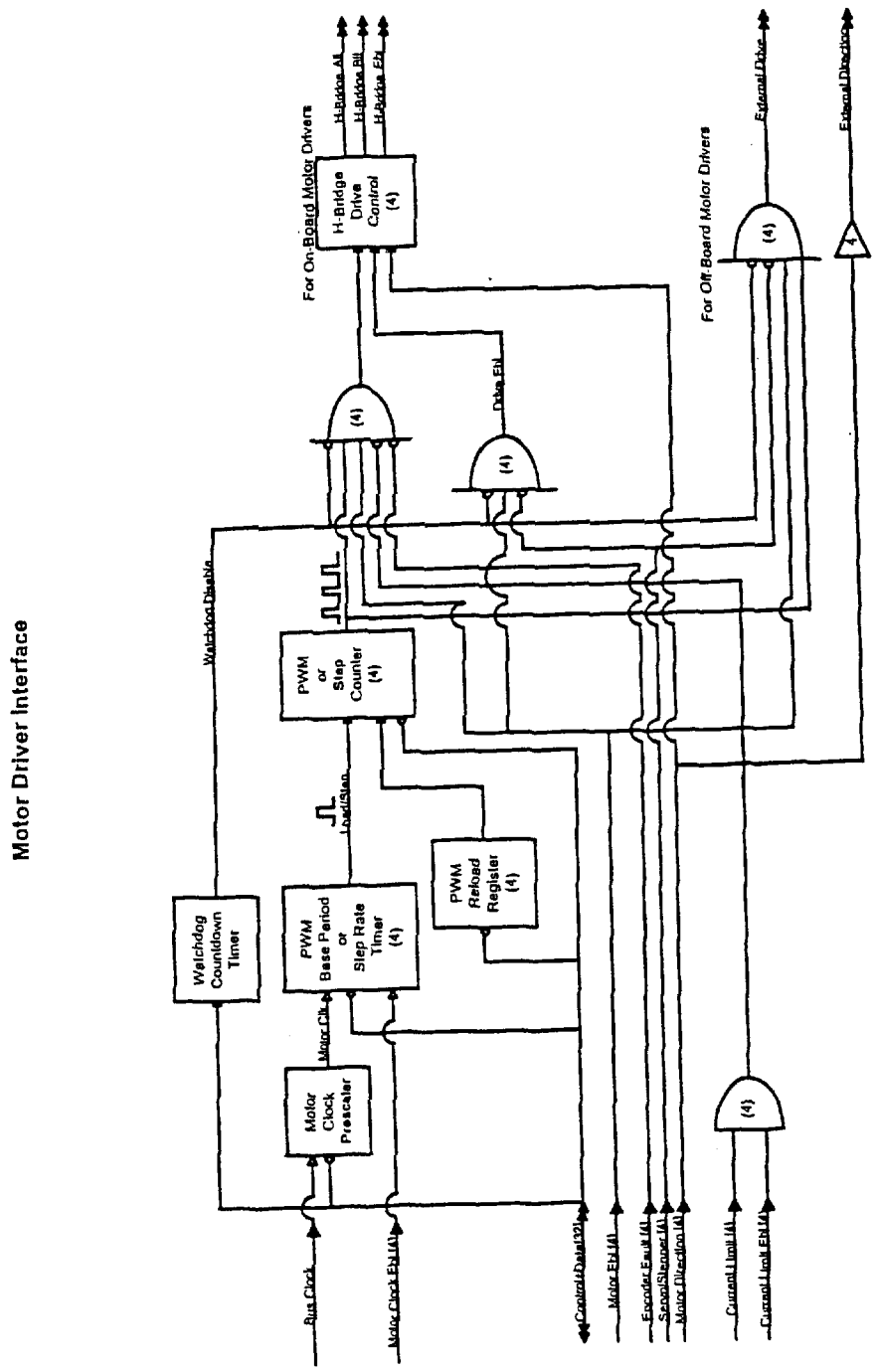
FIG. 9 is a block diagram of the motor driver interface of the field-programmable gate array according to FIG. 1.
Figure 10:
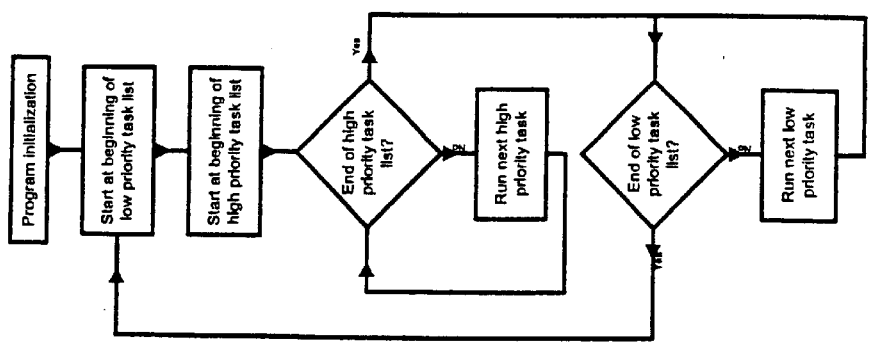
FIG. 10 is a block diagram of the non-preemptive operating system kernel of the central processing unit according to FIG. 1.

The present invention specifically detects errors in phase transitions between the encoder input signals in the FPGA 64. As shown in FIG. 8, input signals from the encoder interface 26 are filtered in digital filters 80 and supplied to a decoder with error detection 82 that detects such errors. If an error is detected, an encoder fault bit is set in the FPGA 64 control register (Encoder Fault). This is input into the motor driver interface of the FPGA 64 as shown in FIG. 9, and the motor output drive is immediately terminated. Then, the motor control routine of the CPU 66 takes over, as to be hereinafter discussed. The motor driver interface shown in FIG. 9 is discussed in more detail hereinafter with the discussion of the motor driver circuits.

FIG. 8 also illustrates the encoder wrap function of the present invention. With reference to a device or motor whose movement is measured by a rotary axis, an encoder interface 26 may be supplied with rotary position inputs that reflect many revolutions about the axis over a period of time. The counter for the affected encoder channel continues to count until the counter reaches its maximum count. Then, the next count causes the encoder counter to change to its maximum negative value, with a loss of true position. One known solution to this problem is to perform a check before every move to see if the encoder count value is near its upper limit. If the possibility exists that the encoder counter might overflow during the move, the counter can be reset to a lesser value by the embedded software of the CPU 66. The current control position and target positions are then adjusted. This solution has the disadvantage that the new position for the encoder must be computed based on the current encoder position, requiring that the encoder not change its value during the time from when the value was sampled until when the new value is written.

The present invention solves this problem by programming the encoder counter 84 to wrap back to a count, usually a zero count, at a specified encoder count. A wrap value for each encoder is preset and provided to the encoder wrap position register 86. An encoder wrap position comparator 88 compares the wrap value with the value of the encoder counter 84. If the comparator 88 shows that the counter value has reached the wrap value, the encoder counter is reset. An encoder wrap event register 90 also records the wrap event in an encoder wrap bit. The embedded code of the CPU 66 then uses the encoder wrap bit in its motor control routine, as will be discussed herein. Thus, the wrap event can occur anytime while the axis is moving without losing or missing any encoder counts.

FIG. 8 also shows the hardware function of the FPGA 64 that allows an output strobe signal to be generated at an exact encoder position specified by a user. This function will be discussed in more detail with the discussion of the embedded code of the CPU 66.

As mentioned, after the FPGA 64 is operational, the embedded code of the CPU 66 makes the controller 10 operational. Specifically, the embedded code is loaded from flash memory 62 into static RAM 68. Then, the software objects that support all the hardware functions on the controller 10 are created. Next, the operating system kernel is created, which is the high-level executive routine for the CPU 66 shown in FIG. 10. The communications and command decoder tasks are created and added to the kernel to be executed, and the board interrupts for communication, motion control, input/output (I/O), etc., are enabled. After all of the these routines are enabled, the CPU 66 preferably issues a reset to the IEEE 1394 Interface 72, which is detected by other modular controllers so connected, if any, including the host PC. The CPU 66 is then able to start receiving software commands for the controller 10, preferably from the host PC as previously discussed.

Figure 11:
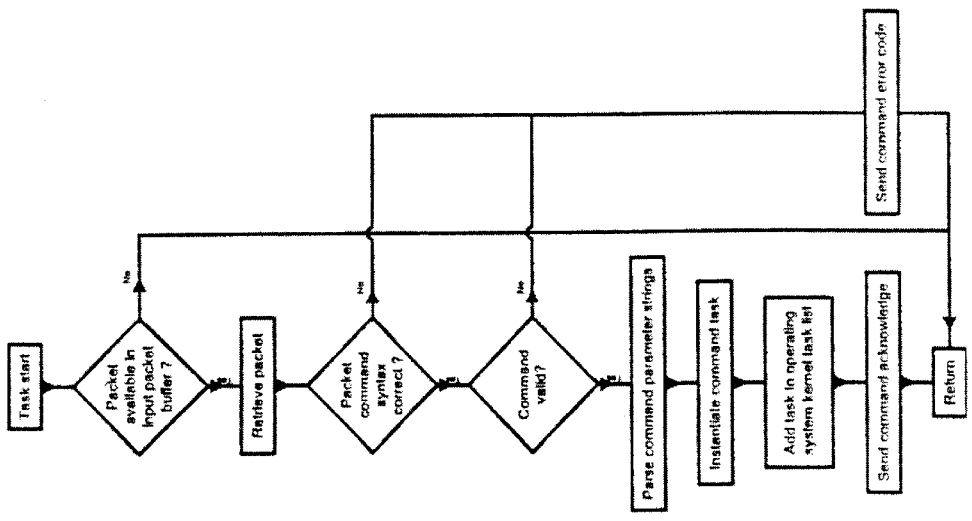
FIG. 11 is a block diagram of the command task creation and queuing of the central processing unit according to FIG. 1.
Figure 12:
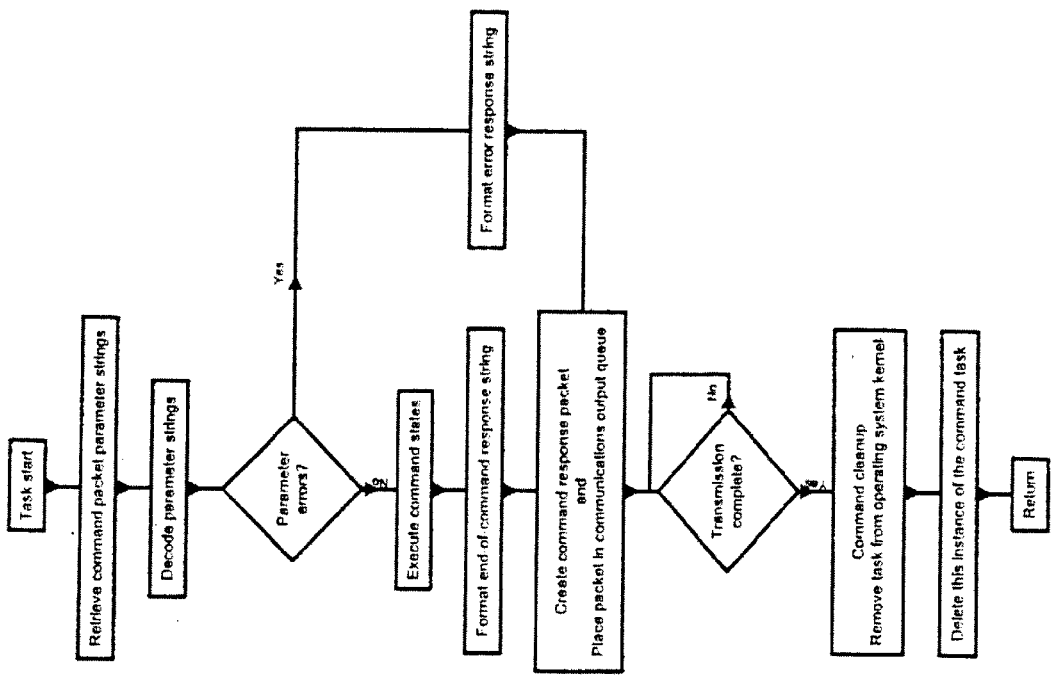
FIG. 12 is a block diagram of the general command task structure of the central processing unit according to FIG. 1.
Figure 13:
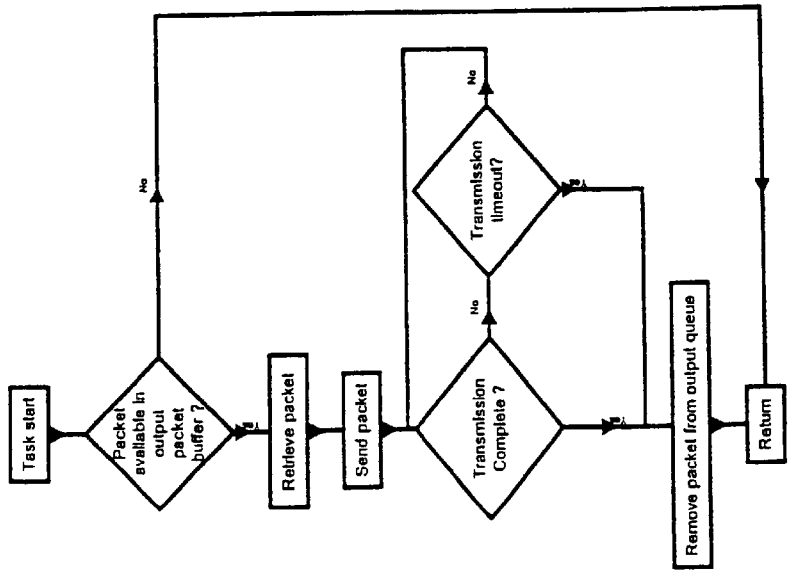
FIG. 13 is a block diagram of the communication response of the central processing unit according to FIG. 1.
Figure 14:
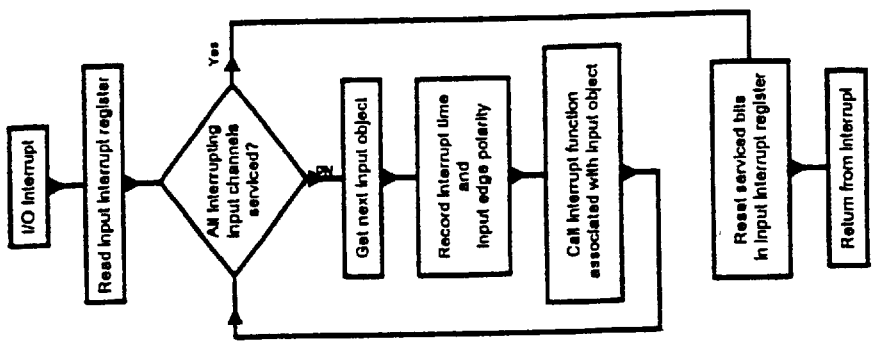
FIG. 14 is a block diagram of the input interrupt routine of the central processing unit according to FIG. 1.
Figure 15:
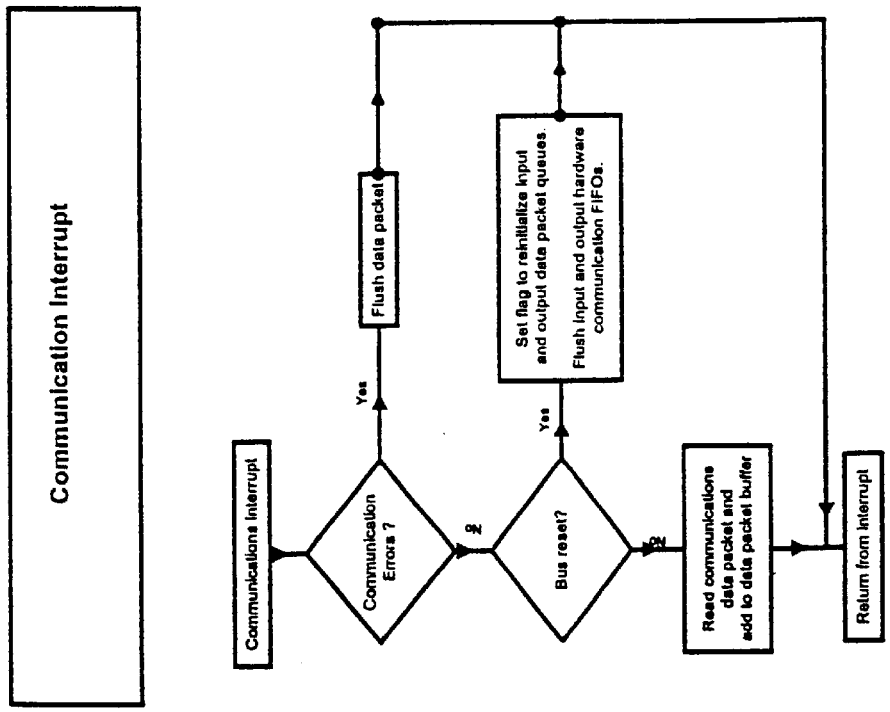
FIG. 15 is a block diagram of the communication interrupt of the central processing unit according to FIG. 1.

The command task creation and queuing routine of the embedded code is shown in FIG. 11. FIG. 12 shows the general command task structure. The embedded code for the communication response of the CPU 66 is shown in FIG. 13. Interrupt routines of the embedded code shown in FIGS. 14 and 15 include an input interrupt and a communication interrupt, respectively. The embedded code represented by FIGS. 10–15 is not described in detail as the functions listed are well known to those of skill in the art.

Figure 16:
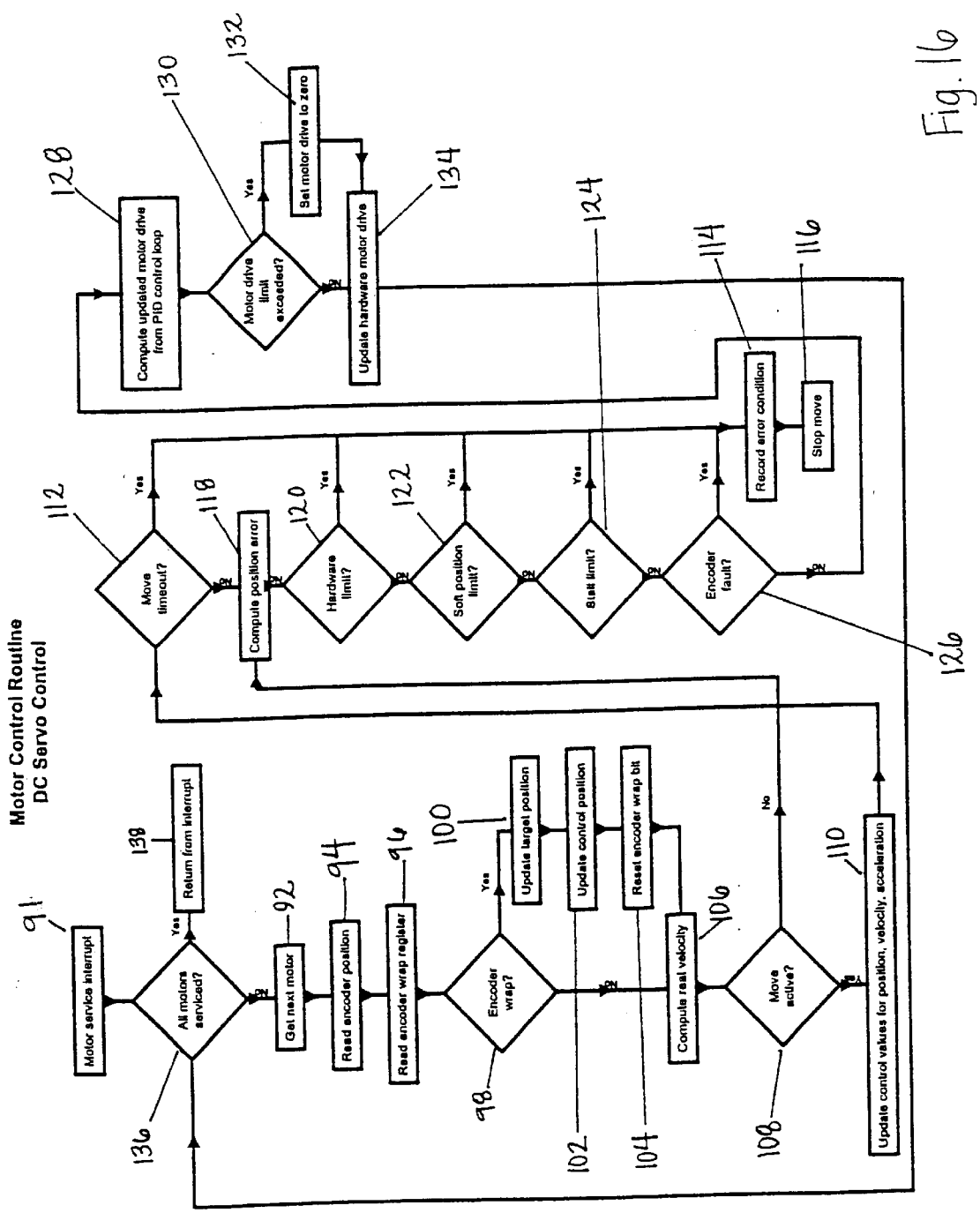
FIG. 16 is a block diagram of the motor control routine of the central processing unit according to FIG. 1.

A motor control routine of the embedded code of the CPU 66 shown in FIG. 16 uses the encoder wrap bit, previously mentioned in the discussion of the FPGA 64. Upon a motor service interrupt at 91, the encoder position of the channel associated with a motor selected at 92 is read at 94. Then, that encoder wrap register is read at 96. If the encoder wrap register reflects that the encoder has wrapped at 98, then the target position is updated at 100, the control position is updated at 102, and the encoder wrap bit is reset at 104. Then, real velocity is computed at 106. If the encoder wrap register, at 98, reflects that the encoder has not wrapped, the routine advances directly to 106, where the real velocity is computed.

Next, at 108, if the move is active, then the control values are updated for position, velocity and acceleration at 110. The routine at 112 then queries whether the move is not active and has timed out. If so, an error condition is recorded at 114, and additional moves are stopped at 116. If the move had not timed out, i.e., it was completed, the position error is computed at 118. Returning now to 108, if the move is not active, the code advances to 118 to compute the position error.

After the position error is computed at 118, the routine next checks to see if a series of limits have been reached. The hardware limit, soft position limit and stall limit are checked, respectively, at 120, 122 and 124. If any of these limits are exceeded, the routine proceeds to 114, where the error condition is recorded, and 116, where additional moves are stopped.

As mentioned, if there is an error detected in the phase transitions between an encoder's input signals, an encoder fault bit is set in the FPGA control register, shown in FIG. 4. This register is read during every motor service interrupt to determine the status of the encoder fault bit at 126. If the error condition is present, the error condition is recorded as an error code at 114 and the move is stopped at 116. This error code is passed along to any commands attempting to use that motor, and the error must explicitly be reset in order for motor drive operation to continue.

If no limits have been reached and the encoder fault bit does not indicate the presence of an error, the routine advances to 128 where the updated motor drive is computed. If the motor drive limit is exceeded at 130, then the motor drive is set to zero at 132. The hardware motor drive is then updated at 134. If the motor drive limit has not been exceeded at 130, the routine proceeds directly to 134 to update the hardware motor drive. Then, a check is made as to whether all of the motors have been serviced at 136. If they have not, the routine repeats for the next motor starting at 92. If all motors have been serviced, the routine returns from interrupt at 138.

Figure 17:
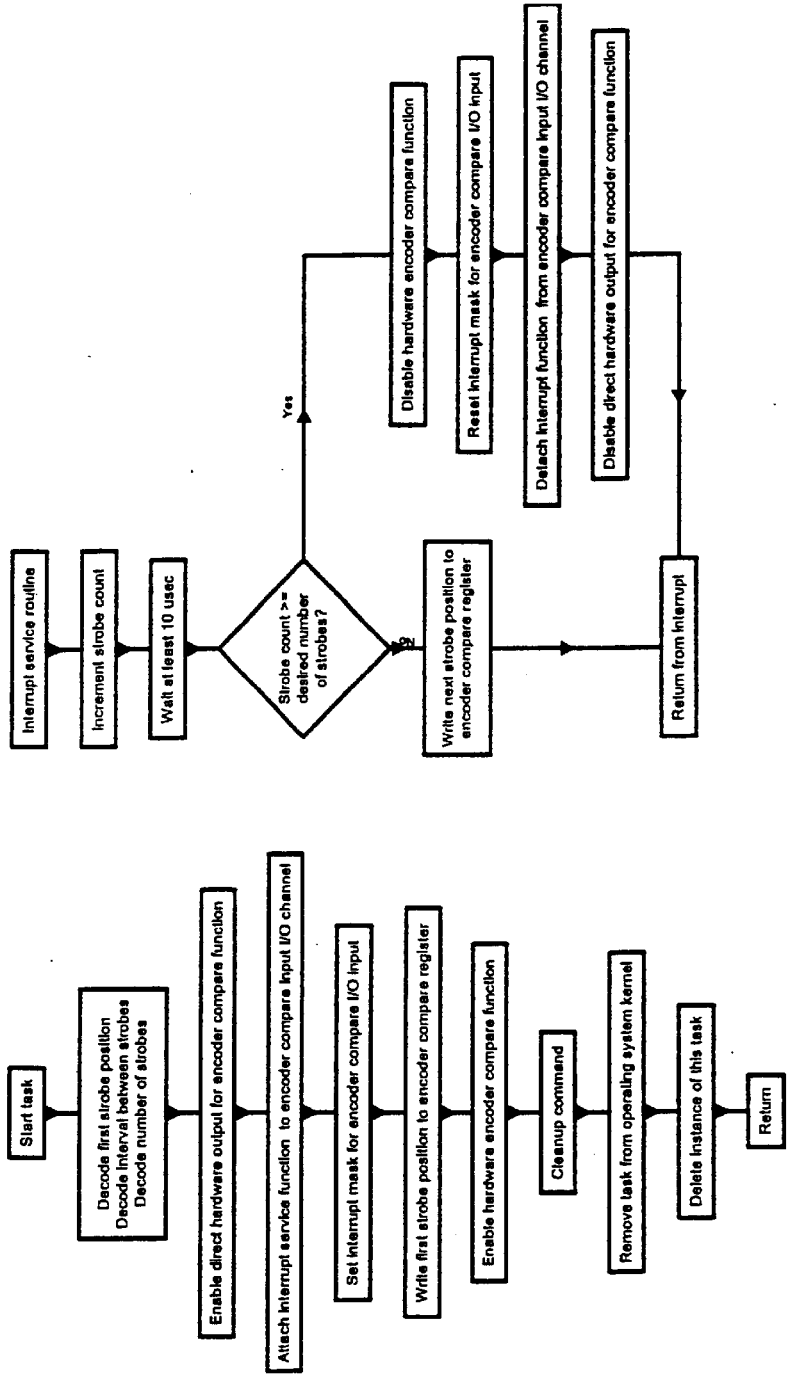
FIG. 17 is a block diagram of the position strobe signal generation of the central processing unit according to FIG. 1.

FIG. 17, showing the embedded code for the generation of the strobe signal, has previously been mentioned with reference to the encoder interface of the FPGA 64, shown in FIG. 8. The use of the strobe signal can be illustrated by an example in which a robot is moving a wafer from one position to another ten inches away, and it is desired to operate a camera to capture an image of the wafer at the six-inch position. In conventional firmware or software implementations, the processor may cause a delay in capturing the image past the intended six-inch position due to a delay in processing the command. The embedded code for the generation of a position strobe signal shown in FIG. 17 enables and disables the hardware function shown in FIG. 8 by a signal sent to the output strobe encoder comparator 144. The code also specifies a starting encoder position and a number of counts until the output strobe to the encoder position register 140 of the FPGA 64. Once supplied with this information, the FPGA 64 generates a strobe signal, i.e., supplies an enabling signal to an appropriate digital output connector 34, without intervention of the CPU 66. The FPGA 64 does this by comparing the output of an encoder multiplexer 142, whose input is the output of the encoder counter 84, to the output of the encoder position register 140 using the encoder comparator 144. When the encoder comparator 144 indicates a match, the output strobe triggers. Then, the FPGA 64 notifies the CPU 66, which sends the next encoder position and number of counts until the next output strobe. The encoder comparator 144 is disabled when no additional strobe positions exist.

As previously mentioned, the processor card 14 includes serial connectors in the form of three IEEE 1394 ports 70 and two RS232 serial ports 74. Each IEEE 1394 port 70 is connected to the other components of the processor card 14 through an IEEE 1394 Interface 72. The IEEE 1394 Interface 72 is a standard IEEE 1394-1995 compatible interface including a transceiver/arbiter interfaced to a standard high-speed serial-bus link-layer controller (not shown). Each RS232 serial port is connected to the other components of the processor card 14 through an RS232 Interface 76. The RS232 serial interface is a standard RS232 compatible interface including a dual universal asynchronous receiver-transmitter and an RS232 driver (not shown). In general, the IEEE 1394 ports 72 are used to interconnect the controller 10 with other controllers of other subsystems of a larger system and the host PC, while the RS232 serial ports 74 are used to interconnect the controller 10 with peripheral devices. Although these ports 70, 74 and interfaces 72, 76 are preferably IEEE 1394 and RS232 compatible, respectively, other communications protocols such as RS485, CAN, Ethernet and USB are possible.

These serial connectors allow peer-to-peer communication between controllers and allow parallel operation of devices connected to and/or controlled by the controller 10. For example, a sensor input received by one modular controller 10 can cause a series of actions of an device, such as a heater, receiving output signals from another controller. This feature is taken advantage of in the present invention by event software commands.

The controller 10, and other controllers with which it is interconnected, can be set up for a number of command event sequences using these event software commands. In a command event sequence, the host PC sends certain event commands to the controller 10 so that upon the completion of the command, an event identification signal (ID) is broadcast to all other controllers. This broadcast ID indicates that a certain event has occurred. The other controllers are set up to execute a command when a specific event ID is received. If the event ID matches any waiting command at the receiving controller, the waiting command is immediately executed. Completion of that command may in turn send another event ID to other waiting commands. This allows sequences of actions to be set up and, once initiated, allows the execution of a simple or a complex sequence of commands among the controllers with no host processor intervention. This reduces the communication latencies in executing the sequential commands in the processor of the host PC and enhances real-time performance.

An example of one command broadcast sequence demonstrates its usefulness. A robot placing a wafer onto a receiving stage has its own modular controller. When the receiving stage senses the presence of the wafer, it needs to communicate to the robot to halt its motion and let go of the wafer. In this case, the robot can be set up with two commands to execute on an event occurrence: (1) stop its motion; and (2) release its grip on the wafer. The receiving stage is set up with a command that sends an event ID on the occurrence of the input associated with its vacuum sensor. When the receiving stage senses the wafer, the event ID is broadcast. The robot receives the event ID, determines that it is a match to its two waiting commands and starts execution of the two commands. The conclusion of each command is returned to the host PC so that it can synchronize the completion of the entire command sequence. Without this command sequence, the software of the host PC could introduce indeterminate latencies, possibly resulting in stress or damage to the wafer. For example, the motion of the robot might not be stopped or the wafer released quickly enough to prevent the wafer from being stressed during its placement on the receiving stage.

Motor Driver Circuits

One particularly useful feature of the controller 10 is the inclusion of four motor driver circuits 38, each connected to a motor connector 40. The motor driver circuits 38 and motor connectors 40 are included on the distribution card 12 in the embodiment shown in FIG. 1 (only one of each shown). Each motor driver circuit 38 receives inputs from and provides an output to the processor card 12 and drives a motor, usually a servo motor, through the motor connector 40. A bypass is also provided whereby instead of a motor driver circuit 38 driving a particular motor through the motor connector 40, TTL level signals are sent directly to the motor connector 40 to control an external driver or a stepper motor, as mentioned below.

Figure 18:
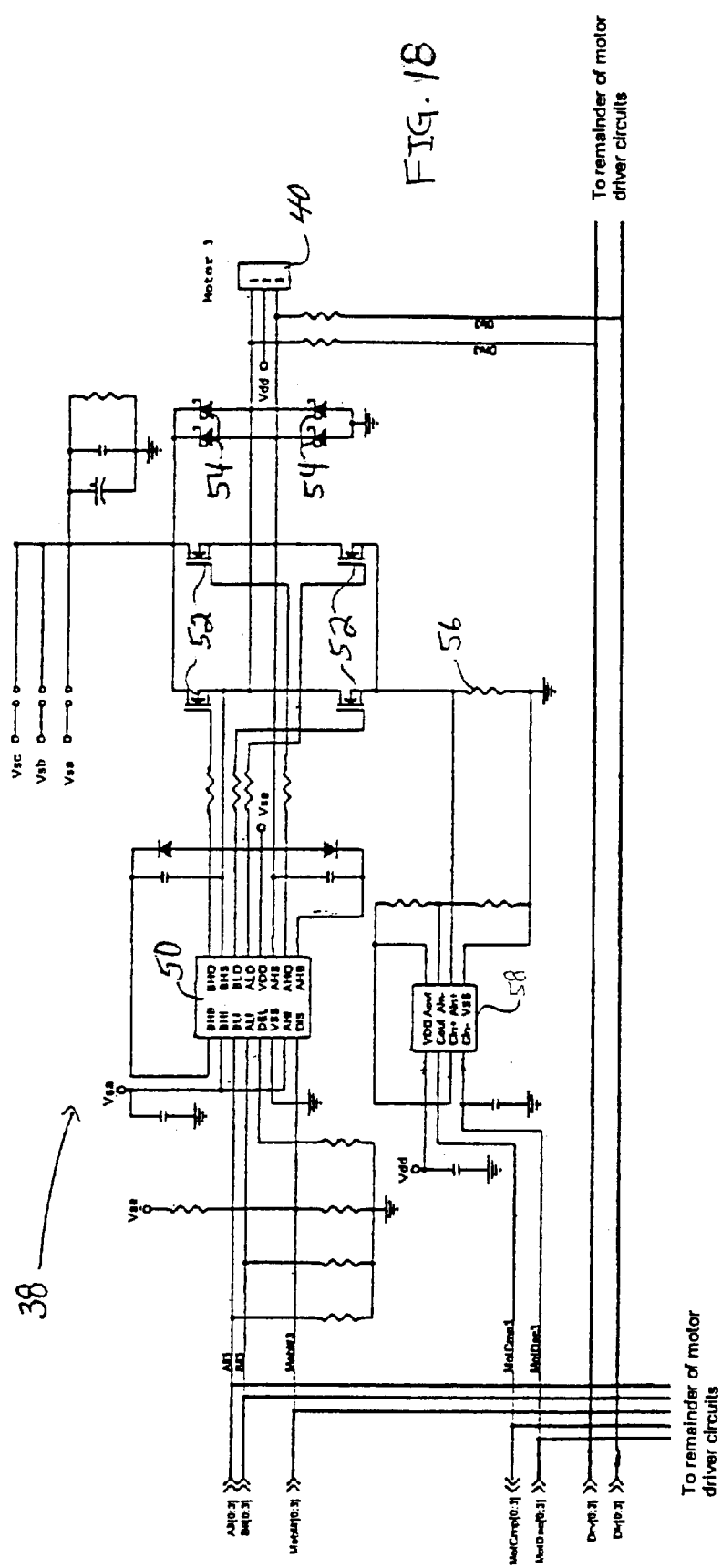
FIG. 18 is a schematic diagram of one of the four motor drivers of the distribution card according to FIG. 1.

One possible design for the motor driver circuits 38 can more clearly be seen in FIG. 18. Only one motor driver circuit 38 and its associated motor connector 40 is shown, but each driver circuit 38 is similar in design. The motor connector 40 is a three-pin connector by example. The motor driver circuit 38 includes an N-channel MOSFET driver integrated circuit (IC) 50 configured as a PWM mode switcher through the use of four power MOSFETs 52 and four Schottkey barrier rectifiers 54. The MOSFET driver 50 for motor/actuator 3 receives input Mebl#3, which is a disable signal that, if high, overrides all the other inputs, and Ali3 and Bli3, which together determine which outputs of the MOSFET driver 50 are enabled when Mebl#3 is low. One suitable MOSFET driver 50 is the HIP4082 driver from Harris Semiconductor (Intersil Corporation) of Palm Bay, Fla. The outputs of the MOSFET driver 50 are provided to pins 1 and 3 of the motor connector 40. Optionally, the logic level signals Drv3 and Dir3 may be connected to the pins of motor connector 40 in order to provide TTL level signals for controlling an external motor driver amplifier or stepper motor controller. In this case, the Mebl#3 signal is high to disable the on-board MOSFET drivers 50.

A lead to a node between the power MOSFETs 52 and rectifiers 54 of each motor driver circuit 50 is connected to jumpers that optionally supply a different operating voltage to motor 3, here one of switchable voltages Vsa, Vsb or Vsc, as discussed with reference to the power switch 30.

Monitoring of the current through the MOSFET drivers 50 is provided by a small sense resistor 56. The signal produced by the sense resistor 56 is buffered and amplified by an operational amplifier (op amp) whose output is connected to the input of a comparator. The other input of the comparator receives an input reference voltage, here MotDac3 from the processor card 14, and the output of the comparator is a signal MotCmp3 provided to the processor card 14, along with similar signals from the remainder of the motor driver circuits 38. The signal MotCmp[0:3] indicates whether or not the current to each motor/actuator has exceeded a limit established by the value of the comparator input reference voltage. Although the op amp and comparator can be hardware devices, preferably they are contained on one IC op amp/comparator 58 as shown in FIG. 18.

Operation of a motor controlled by either a motor driver circuit 38 or directly by signals through a motor connector 40 has been touched upon at various points in the description. For example, the use of switchable operating voltages, such as Vsa, Vsb and Vsc, which are shown at the jumpers in the motor driver circuit 38, has been mentioned. In addition, the motor control routine of the embedded code of the CPU 66 shown in FIG. 16 has been described herein. The motor driver interface of the FPGA 64 shown in FIG. 9 has also been mentioned briefly. This digital logic interface of the FPGA 64 receives signals indicating a particular command for a motor and transforms them into input signals for the motor driver circuit 38 based upon whether the on-board driver is to be used or whether an external driver or stepper motor is receiving direct TTL level signals.

The axis software commands for the controller 10 relate, in general, to the position and movement of each axis. When referring to the position of an axis, this means the position of a tool, component or workpiece along an axis. Similarly, when referring to the movement of an axis, this means the movement of a tool, component or workpiece along an axis. The software commands for the position and movement of an axis thus relate to the motor associated with the axis. For example, one command downloads or uploads the motor parameters for a specified axis. The motor parameters include, among other things, the position at which the encoder will wrap, the encoder connector 26 to which the encoder is connected, the motor acceleration and current limits, and the maximum and minimum position limits for the motor. Other commands include a command to enable or disable the drive to a particular axis, and a command causing power to be applied to a motor in an open loop fashion. Another command is used to get the error status for a motor and is used to reset any or all of the error flags.

Many commands control the movement of an axis. One command causes the axis to repeatedly cycle back and forth between two specified positions. Another command the axis to a new position by either specifying the new position or specifying a change from its current position. Of course, standard commands such as that establishing the zero, or home, location of an axis are also included.

Preferably, the controller 10 includes commands to minimize the need for the sequential processing of commands by the CPU 66 and the host processor, thus speeding up the operation of the controller 10. The broadcast commands have previously been discussed. In addition, a linking command enables an axis, i.e., the linked axis, to be electronically linked to another axis, i.e., the parent axis. The linking command can, for example, make the linked axis linearly dependent on the parent axis. Thus, a command to move the parent axis 22 cm could also cause the linked axis to move 11 cm.

Another command coordinates movement of several axes through a number of spatial coordinates along the motion path by specifying one axis as a master control axis and with at least two slave axes. For this command, the master axis can be a non-physical, or virtual, axis. The path distance of the move through all the spatial coordinates is computed and treated as a one-dimensional distance by the virtual axis. The encoder resolution of the virtual axis is computed as the multidimensional diagonal of the encoder resolutions of the individual slave axes. The motion control parameters associated with the master axis, jerk, acceleration, and velocity, for example, will control the jerk, acceleration and velocity of the control point as it moves through the spatial coordinates. This technique allows the dynamics of the control point to be set as though a single axis is being moved.

The modular controller presented can control multiple axes and allows peer-to-peer communications between outputs, especially motors, including motors connected to another controller, that minimize the need for sequential processing of commands through the CPU 66 and any host processor of a host PC.

What is claimed is:

1. A multiple axis modular controller for use in a system comprising input devices receiving indications of system conditions and output devices performing tasks affecting the system conditions, the output devices including at least a first motor and a second motor, the first motor and the second motor operable to cause movement of a first axis and a second axis, respectively, the controller comprising:

a plurality of input connectors, each of the plurality of input connectors connectable to a respective one of the input devices;

a plurality of output connectors, each of the plurality of output connectors connectable to a respective one of the output devices;

a processor operable to execute a series of sequential commands of an application program; and means, separate from the processor, for executing a command in response to one of completion of one sequential command of the series of sequential commands regardless of a next sequential command in the series of sequential commands, a specified input received at one of the plurality of input connectors, and a specified output sent to one of the plurality of output connectors.

2. The controller according to claim 1 wherein one of the plurality of input connectors is an analog input connector connectable to an input device providing analog signals, the controller further comprising:

means for initiating an analog-to-digital conversion of an analog signal received by the analog input connector when a predetermined amount of time passes from receipt of an initial analog signal from the analog input connector.

3. The controller according to claim 1, further comprising:

a serial connector connectable to a wafer aligner.

4. The controller according to claim 1 wherein the means for executing a command further comprises a non-volatile interface for accessing and decoding data from and providing data to at least one like controller.

5. The controller according to claim 1, further comprising:

means for controlling movement of the first axis and the second axis using input signals from only one input connector.

6. The controller according to claim 1 wherein a first input connector is connectable to a first encoder measuring movement of the first axis and a second input connector is connectable to a second encoder measuring movement of the second axis, the controller further comprising:

means for detecting errors in phase transitions between sequential input signals from at least one of the first input connector and the second input connector.

7. The controller according to claim 1 wherein a first input connector is connectable to a first encoder measuring movement of the first axis, the controller further comprising:

a logic circuit operable to produce a signal at specified positions of the first axis.

8. The controller according to claim 1, further comprising:

a serial port connectable to a host processor; and a non-volatile interface for accessing and decoding data from and providing data to the host processor.

9. The controller according to claim 1, further comprising:

means for coordinating movement of at least two axes through a number of spatial coordinates along a motion path of a virtual axis.

10. A controller according to claim 1, further comprising:

a first output connector connectable to one of the first motor and an external driver of the first motor;

a motor driver circuit connected to the first output connector, the motor driver circuit including a motor driver; and means for disabling the motor driver when the first motor has the external driver.

11. A method of operating a multiple axis modular controller in a system comprising input devices receiving indications of system conditions and output devices performing tasks affecting the system conditions, the output devices including at least a first motor and a second motor, the first motor and the second motor operable to cause movement of a first axis and a second axis, respectively, the method comprising:

connecting each of a plurality of input connectors to a respective one of the input devices;

connecting each of a plurality of output connectors to a respective one of the output devices;

executing a series of sequential commands of an application program using a processor; and executing, using means separate from the processor, a command in response to one of completion of one sequential command of the series of sequential commands regardless of a next sequential command in the series of sequential commands, a specified input received at one of the plurality of input connectors, and a specified output sent to one of the plurality of output connectors.

12. The method according to claim 11, further comprising:

connecting an input device providing analog signals to an analog input connector, the analog input connector being one of the plurality of input connectors; and initiating an analog-to-digital conversion of an analog signal received by the analog input connector when a predetermined amount of time passes from receipt of an initial analog signal from the analog input connector.

13. The method according to claim 11, further comprising:

connecting a wafer aligner to a serial connector.

14. The method according to claim 11 wherein executing the command further comprises connecting a non-volatile interface to a like controller, the non-volatile interface accessing and decoding data from the controller, the method further including:

affecting an output of the like controller upon executing the command.

15. The method according to claim 11, further comprising:

controlling movement of the first axis and the second axis using input signals from only one input connector.

16. The method according to claim 11, further comprising:

connecting a first input connector to a first encoder measuring movement of the first axis;

connecting a second input connector to a second encoder measuring movement of the second axis; and detecting errors in phase transitions between sequential input signals from at least one of the first input connector and the second input connector.

17. The method according to claim 11, further comprising:

connecting a first input connector to a first encoder measuring movement of the first axis; and producing, using a logic circuit, a signal at specified positions of the first axis.

18. The method according to claim 11, further comprising:

connecting a host processor to a serial port; and accessing and decoding data from and providing data to the host processor using a non-volatile interface.

19. The method according to claim 11, further comprising:

coordinating movement of at least two axes through a number of spatial coordinates along a motion path of a virtual axis.

20. A method according to claim 11, further comprising:

connecting a first output connector to one of the first motor and an external driver of the first motor, a motor driver circuit connected to the first output connector and the motor driver circuit including a motor driver; and disabling the motor driver when the first motor has the external driver.

* * * * *